United States Patent [19]

Coran et al.

[11] 4,116,914

[45] Sep. 26, 1978

[54] ELASTOPLASTIC COMPOSITIONS OF ETHYLENE-VINYL ACETATE RUBBER AND POLYOLEFIN RESIN

[75] Inventors: Aubert Y. Coran; Raman P. Patel, both of Akron, Ohio

[73] Assignee: Monsanto Company, St. Louis, Mo.

[21] Appl. No.: 768,329

[22] Filed: Feb. 14, 1977

[51] Int. Cl.² .............................................. C08L 23/08
[52] U.S. Cl. ........................ 260/30.6 R; 260/31.8 M; 260/33.2 R; 260/42.42; 260/897 B
[58] Field of Search ..................................... 260/897 B

[56] References Cited

U.S. PATENT DOCUMENTS

| | | | |
|---|---|---|---|
| 3,218,373 | 11/1965 | Salyer | 260/897 B |
| 3,226,454 | 12/1965 | Marans | 260/897 B |
| 3,399,250 | 8/1968 | Kirk et al. | 260/897 B |
| 3,433,573 | 3/1969 | Holladay et al. | 260/897 B |
| 3,929,724 | 12/1975 | Miyauchi et al. | 260/897 B |

*Primary Examiner*—Carman J. Seccuro
*Attorney, Agent, or Firm*—Larry R. Swaney

[57] ABSTRACT

Elastoplastic compositions are described comprising blends of cross-linked ethylene-vinyl acetate (EVA) rubber and thermoplastic polyolefin resin.

14 Claims, No Drawings

ELASTOPLASTIC COMPOSITIONS OF ETHYLENE-VINYL ACETATE RUBBER AND POLYOLEFIN RESIN

The invention relates to thermoplastic compositions containing polyolefin resins and EVA rubber generally found in U.S. patent class 260, subclass 897, and, more particularly, to elastoplastic compositions comprising blends of polyolefin resin and cross-linked EVA rubber.

BACKGROUND OF THE INVENTION

Thermoplastic compositions comprising blends of polyethylene and ethylene-vinyl acetate copolymer in which compositions the polymers are cross-linked are known, U.S. Pat. No. 3,399,250. Thermoplastic compositions comprising blends of polypropylene and ethylene-vinyl acetate copolymer which compositions optionally may be cross-linked are also known, U.S. Pat. No. 3,433,573. The aforesaid thermoplastic compositions are described as being useful in the preparation of fibers, films and molding, but, their utility is limited to applications of relatively rigid, inelastic members because a lack of elasticity makes them unsuitable for applications where softness and elasticity are needed.

Elastoplastic compositions exhibit both thermoplastic and elastomeric properties, i.e., the compositions process as thermoplastics but have physical properties like elastomers. Elastoplastic compositions offer the advantages of thermoplastics since shaped articles may be formed by extrusion, injection molding and compression molding and eliminates the time-consuming step required in preparing elastomers by conventional vulcanization. In addition, elastoplastics can be reprocessed without the need for reclaiming and can be thermally welded.

SUMMARY OF THE INVENTION

Elastoplastic compositions in accordance with this invention comprise blends containing sufficient thermoplastic crystalline polyolefin resin to impart thermoplasticity and sufficient cross-linked EVA rubber to impart rubberlike elasticity. Blends containing insufficient amounts of polyolefin resin are incoherent (granular) compositions resembling scorched rubber which blends are not processable as thermoplastics, whereas, blends containing insufficient amounts of cross-linked EVA rubber are not elastomeric. The relative proportions of polyolefin resin and EVA rubber necessary to provide sufficient EVA rubber to give elastomeric compositions and necessary to provide sufficient polyolefin resin to give thermoplastic compositions cannot be defined with precision because the limits vary depending upon a number of factors, such as, the kind of the resin or rubber, the presence of rubber plasticizer and other ingredients, and the extent the rubber is cross-linked. For example, plasticized EVA rubber can be used in place of neat EVA rubber to obtain elastoplastic compositions of the invention in which the relative proportion of polyolefin resin to EVA rubber exceeds the relative proportion necessary to obtain elastoplastic compositions containing only polyolefin resin and EVA rubber and no plasticizer. Also, blends containing highly cross-linked rubber require more polyolefin resin to maintain thermoplasticity than blends in which the rubber is cross-linked to a lesser extent. However, the relative proportion of polyolefin resin and EVA rubber in any composition necessary to obtain elastoplasticity is readily determined by preparing blends as hereinafter described and by observation of the properties and fabricability of the resulting composition.

In general, elastoplastic compositions of the invention comprise a blend of about 15 to about 65 parts by weight thermoplastic crystalline polyolefin resin, and correspondingly about 85 to about 35 parts by weight of cross-linked EVA rubber or cross-linked plasticized EVA rubber. Preferred elastoplastic compositions contain sufficient polyolefin resin to impart thermoplasticity to the composition up to 45 weight percent of the combined weight of polyolefin resin, EVA rubber and rubber plasticizer and sufficient cross-linked EVA rubber to impart rubberlike elasticity to the composition up to 80 weight percent of the combined weight of polyolefin resin, EVA rubber and rubber plasticizer and the amount of rubber plasticizer is 0-50 weight percent of the EVA rubber. More preferred compositions are blends exhibiting high strength and elasticity comprising about 30 to about 50 parts by weight polyolefin resin, preferably, polypropylene, and about 70 to about 50 parts by weight cross-linked EVA rubber per 100 total parts by weight resin and rubber.

To obtain the elastoplastic compositions of the invention, it is essential that the EVA rubber is cross-linked to the extent that the gel content is at least 90 percent or more, and preferably, the rubber is cross-linked to the extent that it is completely gelled. Failure to adequately cross-link the rubber gives thermoplastic but non-elastic compositions. Generally, the elasticity of the composition is enhanced with higher proportions of EVA rubber and with increasing gel content. The elastoplastic compositions of the invention are elastomeric and processable as thermoplastics although the rubber is cross-linked to a point where it is at least 85 percent, preferably 90% or more, insoluble in an organic solvent for the unvulcanized rubber (such as toluene at room temperature) and thermoplasticity is retained even when the rubber is cross-linked to the extent that the rubber is essentially completely insoluble. The blends of the invention are envisaged as comprising microsized particles of cross-linked rubber dispersed throughout a continuous polyolefin resin matrix.

As indicated above, the thermoplastic elastomers (elastoplastic compositions) of the invention are rubbery compositions in which the rubber portion of the blend is cross-linked to a gel content of 90 percent or more but the properties can be improved by further cross-linking the rubber until it is essentially completely cured which state of cure is indicated by a gel content of 95% or more. However, in this connection, essentially complete gelation of say 98% or 99% or more is not always a necessary criterion of a fully cured product because of differences in molecular weight, molecular weight distribution and other variables among EVA rubbers which influence the gel determination.

It should not be assumed from the fact that the amount of curative is based on the rubber content of the blend and is that amount which gives with the rubber alone the aforesaid extent of cure that the curative does not react with the polyolefin resin or that there is no reaction between the resin and rubber. There may be highly significant reactions involved but of limited extent so as not to cross-link the resin to the point to lose thermoplasticity. A large proportion of the polyolefin resin can be removed from the blend by extraction with a solvent for the resin such as boiling xylene. The amount of rubber which has been rendered soluble by grafting onto the polyolefin resin does not exceed three weight percent, generally one weight percent or less, of the amount of polyolefin resin in the composition.

Another measure of extent of cure is cross-link density. This is reflected by measurements of equilibrium swelling of the cured rubber in a suitable solvent. The greater the extent of swelling or solvent imbibition, the less is the cross-link density and hence the less is the extent of cure. The cured rubber of the invention, when cured in the absence of polyolefin thermoplastic resin, under the conditions of time, temperature and curative loading of the blended rubber, is cured to the extent that when swollen by toluene for 48 hours, it imbibes no more solvent than 16 times its dry weight, preferably less than 10 times or more preferably less than 7 times its dry weight. It should be noted that an over cure can occur in which properties will be somewhat inferior to the optimum case.

Vulcanizable rubbers, although thermoplastic in the unvulcanized state, are normally classified as thermosets because they undergo the process of thermosetting to an unprocessable state. The products of the instant invention, although processable and reprocessable as thermoplastics, are prepared from blends of EVA rubber and polyolefin resin which are treated under time and temperature conditions to cross-link the rubber or are treated with curatives in amounts and under time and temperature conditions known to give cured rubber products from static cures of the rubber in molds and, indeed, the rubber of the blend has undergone gelation to the extent characteristic of rubber cured in molds. Thermosets are avoided in the compositions of the invention by simultaneously masticating and curing the blends of rubber and molten resin. The polyolefin resin and rubber are mixed using conventional masticating equipment, such as Banbury mixer, Brabender mixer, or certain mixing extruders, at a temperature sufficient to soften the resin or, more commonly, at a temperature above its melting point. After the polyolefin resin and EVA rubber are intimately mixed, curative is added. Heating and masticating at vulcanization temperatures are generally adequate to complete the cross-link formation in a few minutes or less, but if shorter times are desired, higher temperatures may be used. A suitable range of temperatures for cross-link formation is from about the melting temperature of the polyolefin resin to the decomposition temperature of the rubber which range commonly is from about 125° C. to 270° C. with the maximum temperature varying somewhat depending upon the composition, the presence of antidegradants and the mixing time. Typically, the range is from about 160° C. to 250° C. A preferred range of temperatures is from about 180° C. to about 220° C. To obtain thermoplastic compositions, it is important that mixing continues without interruption during vulcanization. If appreciable cross-linking is allowed after mixing has stopped, a thermoset unprocessable composition may be obtained. A few simple experiments within the skill of the art utilizing available rubbers and curative systems will suffice to determine their applicability for the preparation of the improved products of this invention. For additional information on dynamic cross-linking processes, see Gessler and Haslett, U.S. Pat. No. 3,037,954.

Methods other than the dynamic vulcanization of EVA rubber/polyolefin resin blends can be utilized to prepare compositions of the invention. For example, the rubber can be fully vulcanized in the absence of the resin, either dynamically or statically, powdered, and mixed with the resin at a temperature above the melting or softening point of the polyolefin resin. Provided that the cross-linked rubber particles are small, well dispersed and in an appropriate concentration, the compositions within the invention are easily obtained by blending cross-linked rubber and polyolefin resin. Accordingly, the term "blend" herein means a mixture comprising well dispersed small particles of cross-linked rubber. A mixture which is outside of the invention because it contains poorly dispersed or too large rubber particles can be comminuted by cold milling (to reduce particle size to below about 50$\mu$, preferably below 10$\mu$ and more preferably to below 5$\mu$). After sufficient comminution or pulverization, a composition of the invention is obtained. Frequently, the case of poor dispersion or too large rubber particles is visibly obvious to the naked eye and observable in a molded sheet. This is especially true in the absence of pigments and fillers. In such a case, pulverization and remolding gives a sheet in which aggregates of rubber particles or large particles are not obvious or are far less obvious to the naked eye and mechanical properties are greatly improved.

The term "EVA rubber" as used herein and the claims means rubbery amorphous copolymers of ethylene and vinyl acetate containing 40 to 70, more preferably 45 to 60 percent by weight vinyl acetate. Some crystallinity may be present but essentially completely amorphous rubbers are preferred. Density increases with vinyl acetate content with satisfactory rubbers generally having density between 0.94-1.04. EVA rubbers are prepared by free radical initiated polymerization of ethylene and vinyl acetate at ultra high pressure. The average molecular weight of the copolymer is usually between 100,000 and 400,000. Suitable ethylene/vinyl acetate copolymers and formulation variables are described in greater detail in *Rubber Age*, June 1971, pp. 37-47; July 1971, pp. 63-70 and *Rubber World*, August 1976, p. 27. EVA rubber is commercially available under the trade name Vynathene.

Suitable thermoplastic polyolefin resins comprise crystalline, high molecular weight solid products from the polymerization of one or more monoolefins by either high pressure or low pressure processes. Examples of such resins are the isotactic and syndiotactic monoolefin polymer resins, representative members of which are commercially available. Examples of satisfactory olefins are ethylene, propylene, 1-butene, 1-pentene, 1-hexene, 2-methyl-1-propene, 3-methyl-1-pentene, 4-methyl-1-pentene, 5-methyl-1-hexene and mixtures thereof. Commercially available thermoplastic polyolefin resin, and preferably polyethylene or polypropylene, may be advantageously used in the practice of the invention, with polypropylene being more preferred; atactic polymers are unsuitable.

The compositions of the invention are all processable in an internal mixer, to products which, upon transferring at temperatures above the softening or crystallizing points of the resin phase, to the rotating rolls of a rubber mill, form continuous sheets. The sheets are reprocessable in the internal mixer, after reaching temperatures above the softening or melting points of the resin phase. The material is again transformed to the plastic state (molten state of the resin phase) but upon passing the molten product through the rolls of the rubber mill a continuous sheet again forms. In addition, a sheet of elastoplastic composition of this invention can be cut into pieces and compression molded to give a single smooth sheet with complete knitting or fusion between the pieces. It is in the foregoing sense that "thermoplastic" will be herein understood. In addition, elastoplastic compositions of the invention are further processable to the extent that articles may be formed therefrom by extrusion or injection molding.

Where the determination of extractables is an appropriate measure of the state of cure, an improved elastoplastic composition is produced by cross-linking a blend to the extent that the composition contains no more than about fifteen percent by weight of the rubber extractable at room temperature by a solvent which dissolves the uncured rubber, and preferably to the extent that the composition contains less than ten percent by weight extractable and more preferably less than four percent by weight extractable. In general, the less extractables the better are the properties, although, respectable properties are obtained with extractables as high as fifteen percent. More preferable compositions comprise low quantities of extractable rubber. Gel content reported as percent gel is determined by the procedure of U.S. Pat. No. 3,203,937 which comprises determining the amount of insoluble polymer by soaking the specimen for 48 hours in a solvent for the rubber at room temperature and weighing the dried residue and making suitable corrections based upon knowledge of the composition. Thus, corrected initial and final weights are obtained by subtracting from the initial weight, the weight of soluble components, other than rubber, such as extender oils, plasticizers and components of the resin soluble in organic solvent. Any insoluble pigments, fillers, etc., are subtracted from both the initial and final weights.

The particular results obtained by the aforedescribed dynamic curing process are a function of the particular rubber curing system selected. The curatives and the curative systems conventionally used to vulcanize EVA rubbers are utilizable for preparing the improved elastoplastic compositions of the invention. Any curative or curative system applicable for vulcanizing EVA rubbers may be used in the practice of the invention, for example, peroxide, azide and certain sulfurvulcanizing systems. The selection of any particular vulcanizing systems varies depending upon the nature of the polyolefin resin and the EVA rubber. For example, an organic peroxide as the sole vulcanizing agent is satisfactory with polyethylene but with polypropylene it is preferred to use a co-agent along with the peroxide. The use of curative co-agents suppresses the tendencies of peroxide curatives to degrade the polypropylene. High energy radiation is also utilizable as the curative means.

Examples of suitable peroxide curatives are lauryl peroxide, benzoyl peroxide, lead peroxide, bis-2,4-dichlorobenzoyl peroxide, dicumyl peroxide, di-t-butylperoxide, 2,5-dimethyl-2,5bis(t-butylperoxy)hexane, 1,1-bis(t-butylperoxy)-3,3,5-trimethyl cyclohexane, tris-$\alpha,\alpha$-dimethyl-$\alpha$(t-butylperoxy)-methyl benzene, $\alpha,\alpha$-bis(butylperoxy)diisopropyl benzene, bis-(4-t-butylcyclohexyl)peroxydicarbonate, n-butyl-4,4-bis(t-butylperoxy)valerate and t-butyl perbenzoate. Examples of suitable poly functional cross-linking agents which may be used are dibenzo-p-quinonedioxime, p-quinonedioxime, n-phenylene bismaleimide, triallyl cyanurate, ethylene glycol dimethylacrylate, pentaerythritol triacrylate, trimethylolpropane triacrylate, tetraethylene glycol dimethacrylate, and neopentylglycol diacrylate. Additional examples of acrylate cross-linking agents are listed in the 1975 Rubber World Blue Book on page 398.

The amount of curative varies depending upon the type of curative and the composition of the blend. Enough curative must be used to cross-link the rubber while avoiding excessive quantities of curatives beyond the amount necessary to fully cure the rubber which can result in diminution of properties.

The properties of the elastoplastic compositions of the invention may be modified, either before or after vulcanization, by addition of ingredients which are conventional in the compounding of EVA rubber, polyolefin resin and blends thereof. Examples of such ingredients include carbon black, silica, titanium dioxide, colored pigments, clay, zinc oxide, stearic acid, accelerators, vulcanizing agents, sulfur, stabilizers, antidegradants, processing aids, adhesives, tackifiers, rubber plasticizers, wax, discontinuous fibers such as wood cellulose fibers and extender oils. The addition of carbon black, rubber plasticizer or both, preferably prior to dynamic vulcanization, are particularly recommended. Preferably, the carbon black and/or rubber plasticizer is masterbatched with the rubber and the masterbatch is mixed with the polyolefin resin. Carbon black improves the tensile strength and rubber plasticizer can improve the resistance to oil swell, heat stability, hysteresis, cost and permanent set of the elastoplastic compositions. Typical additives of carbon black comprise about 20-100 parts by weight of carbon black per 100 parts by weight of rubber and usually about 25-60 parts by weight carbon black per 100 parts total weight of rubber and plasticizer. The amount of carbon black which can be used depends, at least in part, upon the type of black and the amount of plasticizer present.

When a rubber plasticizer is added to the rubber, the range of proportions of polyolefin resin to EVA rubber in the composition is extended while still retaining elastoplasticity. For example, with plasticizer, the ratio of polyolefin resin to EVA rubber may be increased without losing rubberlike plasticity. Plasticized EVA rubber containing up to 50 parts by weight, preferably between 10-40 parts by weight, plasticizer per 100 parts by weight EVA rubber are particularly suitable. The higher the molecular weight of the rubber, the more plasticizer can be used. Of course, it is understood that plasticizer need not be present prior to curing the rubber, although it is generally more desirable, and that the properties of elastoplastic composition of the invention may be modified by addition of plasticizer after the rubber is cured. Generally, the quantity of plasticizer when present is beteen 10-30 weight percent of the total composition. Any plasticizer suitable for EVA rubber may be used. Suitable plasticizers include polypropylene glycol, phthalate esters such as dicyclohexyl phthalate, dimethyl phthalate, dioctyl phthalate, butyl benzyl phthalate, benzyl phthalate, phosphates such as tributoxyethyl phosphate, tributyl phosphate, tricresyl phosphate, cresyl diphenyl phosphate, 2-ethylhexyl diphenyl phosphate, isodecyl diphenyl phosphate, and triphenyl phosphate, and phthalyl glycolates such as butyl phthalyl butyl glycolate.

Elastoplastic compositions of the invention are useful for making a variety of articles such as tires, hoses, belts, gaskets, moldings and molded parts. They are particularly useful for making articles by extrusion, injection molding and compression molding techniques. Compositions of the invention also are useful for blending with thermoplastics, in particular, polyolefin resins. The compositions of the invention are blended with thermoplastics using conventional mixing equipment. The properties of the blend depend upon the proportions. Generally, the amount is such that the blend contains sufficient cross-linked rubber to obtain the desired effect.

The stress-strain properties of the compositions are determined in accordance with the test procedures set forth in ASTM D638 and ASTM D 1566. An approximate toughness is calculated by an abbreviated Griffith equation $(TS)^2/E$ (TS=tensile strength, E=Young's modulus). For a detailed analysis, refer to Fracture, edited by H. Liebowitz, published by Academic Press, New York, 1972, Ch. 6, Fracture of Elastomers by A. N. Gent. The term "elastomeric" as used herein and the claims means a composition which possesses the property of forcibly retracting within ten minutes to less than 160% of its original length after being stretched at room temperature to twice its length and held for ten minutes before release. Especially preferred compositions of the invention are rubbery compositions having tension set values of about 50% or less (retracting to 150% or less of its original length) which compositions approximates the definition for rubber as defined by ASTM Standards, V. 28, p. 756 (D1566). More preferred compositions are rubbery compositions having a Shore D hardness of 60 or below or a 100% modulus of 150 Kg./cm$^2$ or less or a Young's modulus below 1500 Kg./cm$^2$.

DESCRIPTION OF PREFERRED EMBODIMENTS

To illustrate the invention, polyolefin resin, EVA rubber, antidegradant, and magnesium oxide are mixed in the indicated proportions (parts by weight) at the indicated rpm in a Brabender mixer at the indicated oil bath temperature. After about 3 minutes the polyolefin resin is melted and a uniform blend is obtained. Curative(s) is then added and mixing is continued until a maximum Brabender consistency is reached (about 4-5 minutes), a free radical scavenger is added and mixing is continued for 2 minutes thereafter. The composition is removed, sheeted, returned to the Brabender mixer and mixed an additional two minutes at the indicated temperature. The composition is sheeted on a roll mill and then compression molded at 215° C. and cooled below 100° C. under pressure before removed. Properties of the molded sheet are measured and recorded. The polyethylene is blow molding grade resin having a melt index of 0.6g/10 min., sp.g. 0.960 and ultimate elongation of 600%. The polypropylene is low flow, general purpose isotactic resin having a specific gravity of 0.902 and 11% yield elongation. The EVA rubber is a copolymer of about equal weight proportions of ethylene and vinyl acetate. Flectol H, a polymer antioxidant, is the trade name for polymerized 1,2-dihydro-2,2,4-trimethylquinoline. Vulcup R, HVA 2, SR-351 and TAC are curatives. Vulcup R is bis(t-butylperoxy)diisopropylbenzene, HVA-2 is m-phenylene bismaleimide, SR-351 is trimethylolpropane triacrylate and TAC is triallyl cyanurate. Polygard, a free-radical scavenger, is tris-nonyl phenyl phosphite. The gel content and extractables as percent of rubber are determined by soaking specimens in toluene at room temperature for 72 hours, removing the specimen and drying to constant weight. Percent gel content is calculated by dividing the weight of the toluene extracted specimen by its original weight and multiplying by 100. Extractables as percent of the rubber is calculated by dividing the weight of the material soluble in toluene by the weight of the rubber in the original specimen and multiplying by 100. The data are shown in Tables I and II.

Referring to Table I, Stocks 2-7 illustrate compositions of the invention comprising polyethylene and EVA rubber cross-linked with different cross-linking agents. Stock 1 is a control. The data show that cross-linking the EVA rubber results in a substantial improvement in tensile strength and toughness with a concurrent improvement in elasticity as shown by the

TABLE I

| Stock No. | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| EVA rubber | 60 | 60 | 60 | 60 | 60 | 60 | 60 | 60 | 60 | 60 | 60 | 60 | 60 | 60 | 60 | 60 |
| Polyethylene | 40 | 40 | 40 | 40 | 40 | 40 | 40 | — | — | — | — | — | — | — | 20 | 20 |
| Polypropylene | — | — | — | — | — | — | — | 40 | 40 | 40 | 40 | 40 | 40 | 40 | 20 | 20 |
| Flectol H | 0.5 | 0.5 | 0.5 | 0.5 | 0.5 | 0.5 | 0.5 | 1.0 | 1.0 | 1.0 | 0.5 | 0.5 | 0.5 | 0.5 | 0.5 | 0.5 |
| Magnesium oxide | 1.8 | 1.8 | 0.9 | 0.9 | 0.9 | 0.9 | 0.9 | 0.9 | 0.9 | 0.9 | 0.9 | 0.9 | 0.9 | 0.9 | 0.9 | 0.9 |
| HVA-2 | — | 1.2 | 0.9 | — | — | — | — | — | 1.2 | 2.4 | — | — | — | — | — | 1.2 |
| Vulcup R | — | 1.2 | 0.75 | 0.6 | 0.6 | 0.75 | 0.75 | — | 1.5 | 3.0 | 0.6 | 0.6 | 0.6 | 0.6 | — | 1.2 |
| TAC | — | — | — | 0.9 | 1.8 | — | — | — | — | — | 0.9 | 1.8 | — | — | — | — |
| SR-351 | — | — | — | — | — | 1.8 | 3.6 | — | — | — | — | — | 1.8 | 3.6 | — | — |
| Polygard | 0.5 | 0.5 | 0.5 | 0.5 | 0.5 | 0.5 | 0.5 | — | 1.8 | 3.6 | 0.5 | 0.5 | 0.5 | 0.5 | 0.5 | 0.5 |
| mix speed, rpm | 100 | 100 | 100 | 100 | 100 | 100 | 100 | 80 | 80 | 80 | 100 | 100 | 100 | 100 | 100 | 100 |
| mix temp., °C | 145 | 145 | 145 | 150 | 150 | 150 | 150 | 180 | 180 | 180 | 175 | 175 | 175 | 175 | 175 | 175 |
| Properties |  |  |  |  |  |  |  |  |  |  |  |  |  |  |  |  |
| TS, Kg./cm$^2$ | 69 | 133 | 193 | 184 | 136 | 175 | 155 | 73 | 123 | 130 | 172 | 182 | 152 | 158 | 48 | 139 |
| 100%M, Kg./cm$^2$ | 64 | 122 | 114 | 159 | 122 | 129 | 119 | 64 | 93 | 99 | 98 | 106 | 94 | 99 | 42 | 94 |
| E, Kg./cm$^2$ | 697 | 656 | 771 | 1154 | 721 | 694 | 723 | 602 | 546 | 436 | 808 | 811 | 825 | 733 | 282 | 712 |
| TS$^2$/E, Kg./cm$^2$ | 7 | 27 | 48 | 29 | 26 | 44 | 33 | 9 | 28 | 39 | 37 | 41 | 28 | 34 | 8 | 27 |
| Elong., % | 450 | 130 | 350 | 150 | 130 | 240 | 220 | 290 | 220 | 160 | 310 | 280 | 370 | 340 | 320 | 280 |
| Hardness, Shore D | 32 | 37 | 36 | 43 | 40 | 40 | 40 | 32 | 37 | 37 | 40 | 39 | 39 | 41 | 29 | 39 |
| Tension set, % | 55 | 42 | 36 | 46 | — | 41 | 43 | 54 | 28 | 25 | 31 | 34 | 38 | 36 | 50 | 41 |
| gel content, % | 44.8 | 98.6 | 99.5 | 98.7 | 99.2 | 99.1 | 98.0 | 43.0 | 97.7 | 95.9 | 98.1 | 97.8 | 95.1 | 96.2 | 44.0 | 95.7 |
| Extractables as % of rubber | 94.6 | 2.5 | 0.9 | 2.3 | 1.4 | 1.6 | 3.6 | 96.8 | 4.0 | 7.6 | 3.3 | 3.8 | 8.6 | 6.7 | 95.1 | 7.4 | reduction in tension set. The data indicates that optimum properties are achieved by selecting the proper curative level and that over curing the rubber by using too much curative results in reduction of physical properties. Stocks 9-14 illustrate compositions of the invention comprising polypropylene and EVA rubber cross-linked with different cross-linking agents. Stock 8 is a control. The data confirm that cross-linking the EVA rubber results in substantial improvement in physical properties including tensile strength, toughness and tension set. It is noteworthy that increasing the curative level in the polypropylene blends results in increases in tensile strength and toughness, whereas, increasing the curative level the same amount in the polyethylene blends results in decreases in tensile strength and toughness. Stock 16 illustrates an elastoplastic composition of the invention wherein the polyolefin resin is a mixture of polyethylene and polypropylene.

The effect of the relative proportion of polyolefin resin and EVA rubber and the effect of the extent of cure of the EVA rubber are illustrated in Table II. The data show that, when the proportion of EVA rubber increases in the blend, the effect of cross-linking the rubber is greater and results in substantial increases in tensile strength, toughness, elongation and elasticity. The data also show that cross-linking the rubber results in a substantial increase in tensile strength and that the increase in tensile strength indicates the extent of cure. Cured compositions of the invention exhibit tensile strengths of at least 50% higher than the uncured blend with preferred compositions exhibiting tensile strengths of at least 100% more than the uncured blend.

TABLE II

| Stock No. | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| EVA rubber | 20 | 20 | 20 | 40 | 40 | 40 | 60 | 60 | 60 | 60 | 60 | 60 | 80 | 80 | 80 |
| Polyethylene | 80 | 80 | 80 | 60 | 60 | 60 | 40 | 40 | 40 | 40 | 40 | 40 | 20 | 20 | 20 |
| Magnesium oxide | 0.6 | 0.6 | 0.6 | 1.2 | 1.2 | 1.2 | 1.8 | 1.8 | 1.8 | 1.8 | 0.9 | 0.9 | 2.4 | 2.4 | 2.4 |
| HVA-2 | — | 0.1 | 0.4 | — | 0.1 | 0.4 | — | 0.3 | 1.2 | 1.2 | 0.9 | 0.9 | — | 0.2 | 0.8 |
| Vulcup-R | — | 0.1 | 0.4 | — | 0.1 | 0.4 | — | 0.3 | 1.2 | 1.2 | 1.5 | 0.75 | — | 0.2 | 0.8 |
| Properties | | | | | | | | | | | | | | | |
| TS, Kg./cm$^2$ | 188 | 241 | 186 | 99 | 155 | 175 | 69 | 147 | 133 | 184 | 167 | 193 | 51 | 117 | 93 |
| 100%M, Kg./cm$^2$ | — | — | 198 | 109 | — | 168 | 64 | 139 | 122 | 121 | 103 | 114 | 10 | 64 | 69 |
| E, Kg./cm$^2$ | 6175 | 6080 | 6350 | 4406 | 2818 | 2436 | 697 | 784 | 656 | 593 | 771 | 172 | 112 | 86 | |
| TS$^2$/E, Kg./cm$^2$ | 6 | 10 | 5 | 2 | 9 | 13 | 7 | 28 | 27 | 60 | 47 | 48 | 15 | 122 | 101 |
| Elong., % | 110 | 80 | 220 | 190 | 90 | 230 | 450 | 190 | 130 | 220 | 240 | 350 | 1130 | 390 | 140 |
| Hardness, Shore D | 59 | 60 | 59 | 51 | 51 | 50 | 32 | 37 | 37 | 31 | 37 | 36 | 18 | 25 | 29 |
| tension set, % | — | — | 71 | — | — | 62 | 55 | 48 | 42 | 32 | 41 | 36 | 23 | 21 | 14 |
| gel content, % | 99.4 | 99.4 | 99.9 | 69.8 | 95.7 | 99.3 | 44.8 | 95.6 | 98.6 | 98.7 | 99.2 | 99.5 | 25.7 | 91.5 | 98.0 |
| Extractables as % of rubber | 3.2 | 3.0 | 0.7 | 77.2 | 11.1 | 1.9 | 94.6 | 7.5 | 2.5 | 2.4 | 1.5 | 0.9 | 96.0 | 11.1 | 2.6 |

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. An elastoplastic composition comprising a blend of about 65 to about 15 parts by weight thermoplastic crystalline polyolefin resin and correspondingly about 35 to about 85 parts by weight cross-linked EVA rubber and rubber plasticizer in an amount of 0-50 weight percent of the EVA rubber wherein the EVA rubber is an amorphous copolymer of ethylene and 40 to 70 percent by weight vinyl acetate and is cross-linked to the extent that the toluene extractables as percent of rubber is 15 or less with the proviso that the combined weight of said resin, EVA rubber and optional rubber plasticizer is such that the amount of EVA rubber does not exceed 80 weight percent and the amount of polyolefin resin does not exceed 45 weight percent of the composition which composition is elastomeric and processable as a thermoplastic.

2. The elastoplastic composition of claim 1 containing up to 50 parts by weight plasticizer per 100 parts by weight EVA rubber.

3. The composition of claim 2 in which the resin is polypropylene or polyethylene.

4. The composition of claim 3 in which the resin is polyethylene.

5. The composition of claim 3 in which the rubber is cross-linked to the extent that the toluene extractables as percent of rubber is 10 or less.

6. The composition of claim 3 in which the rubber is cross-linked to the extent that it will imbibe no more than 10 times its weight of toluene.

7. The composition of claim 5 in which the blend comprises about 30 to about 50 parts by weight polypropylene and about 70 to about 50 parts by weight EVA rubber.

8. The composition of claim 7 in which the blend comprises about 30 to about 50 parts by weight polyethylene and about 70 to about 50 parts by weight EVA rubber.

9. The composition of claim 3 in which the cross-linked EVA rubber is in the form of small dispersed particles essentially of a size of about 50 microns or below.

10. The composition of claim 5 in which the rubber is cross-linked to the extent that it is at least 95% by weight insoluble in toluene at room temperature.

11. The composition of claim 10 in which the blend comprises EVA rubber containing 45 to 60 percent by weight vinyl acetate.

12. The composition of claim 2 having a tensile strength of at least 50% higher than the uncured blend.

13. The composition of claim 9 having a tensile strength of at least 100% more than the uncured blend.

14. The composition of claim 2 prepared by masticating the blend and cross-linking agent at cross-linking temperature until the rubber is cross-linked.

* * * * *